United States Patent [19]
Yatabe

[11] 3,771,349
[45] Nov. 13, 1973

[54] MOISTURE LEAK DETECTOR

[75] Inventor: Eiji Yatabe, Deep River, Ontario, Canada

[73] Assignee: Atomic Energy of Canada Limited, Ottawa, Canada

[22] Filed: Mar. 15, 1972

[21] Appl. No.: 234,842

[30] Foreign Application Priority Data
May 31, 1971 Canada.................................. 114373

[52] U.S. Cl...................... 73/29, 73/40.7, 73/336.5
[51] Int. Cl. ........................................... G01m 3/04
[58] Field of Search..................... 73/336.5, 29, 40.7

[56] References Cited
UNITED STATES PATENTS

| 2,947,166 | 8/1960 | Palmer | 73/40.7 |
| 2,681,571 | 6/1954 | Becker | 73/29 |
| 3,186,225 | 6/1965 | Freeman | 73/336.5 |
| 3,522,732 | 8/1970 | Bauer | 73/336.5 |

*Primary Examiner*—Richard C. Queisser
*Assistant Examiner*—Denis E. Corr
*Attorney*—James R. Hughes

[57] ABSTRACT

A portable moisture leak detector comprising a galvanic cell disposed in an elongated tubular member through which the air to be sampled is drawn. The galvanic cell comprises a pair of dissimilar metal electrodes separated by a deliquescent electrolytic element. Changes in the humidity change the electric output of the galvanic cell. A sudden increase in the output of the cell indicates the presence of a leak enabling it to be located.

5 Claims, 5 Drawing Figures

MOISTURE LEAK DETECTOR

This invention relates to an apparatus for detecting and locating moisture leaks.

A leak detector is described in U.S. Pat. No. 2,947,166 to J. F. Palmer & R. B. Turner issued Aug. 2, 1960. In that device, air from a pipe or vessel suspected of having a leak in drawn past a moisture sensitive element in the form of a hygroscopic salt between two electrodes to which a potential is applied. The moisture content of the hygroscopic salt varies with the moisture content of the air drawn past it, so that the current between the electrodes is a measure of the moisture of the sampled air. The current causes evaporation of moisture from the salt by heating and tends to reach an equilibrium value for a given air moisture content, at a constant air temperature. The current is passed through a resistor and the output of a thermocouple adjacent the resistor is amplified, differentiated, corrected to account for air sample temperature and converted to leak rate.

According to the present invention no attempt is made to measure the leak rate but to provide means for leak detection and location with improved sensitivity. In the preferred embodiment the invention is a portable detector suitable for the detection and location of sources of minute invisible leaks in high temperature steam or pressurized-water equipment such as heat transport circuits, loops, autoclaves, etc.

The air near a leak point is more humid than the ambient atmosphere and therefore means for detecting a region of relatively high humidity will provide means for detecting and locating a moisture leak. The present invention provides a leak detector sensitive to changes in humidity which incorporates a galvanic cell comprising two electrodes of dissimilar metal separated by a deliquescent electrolyte. It has been found that thin porous membranes when impregnated with certain deliquescent salts vary their moisture content in accordance with the ambient air humidity. A galvanic cell having such a membrane as the electrolytic element will have a voltage or current output that varies with the humidity. By keeping the cell size small and by maintaining an adequate flow of air over the electrolytic element the response to humidity changes can be made very rapid. When using such a galvanic cell for leak detection a sudden increase in the output of the cell indicates a region of high humidity. Further searching will enable the source of the leak to be located.

As the purpose of the detector is to detect changes in humidity, it is unnecessary to know the absolute humidity. By applying an external voltage to offset that of the galvanic cell under ambient conditions, it is possible to retain substantially the same sensitivity regardless of the output of the cell. To facilitate the detecting procedure the differential output may be used to trigger a signal light that is responsive to the output when it varies a predetermined amount above ambient conditions.

The present invention comprises; an elongated tubular member having an inlet for receiving an air sample, an outlet and an interconnecting passageway; a galvanic cell sensitive to humidity disposed within the passageway, the cell having a pair of electrodes separated by a deliquescent electrolytic element, one of the electrodes and the electrolytic element being permeable to the air; means to draw the air through the inlet to contact the electrolytic element; and means for detecting a change in electrical output of the galvanic to indicate the presence of a leak.

Preferably the detector has variable voltage supply means for applying an external voltage to offset the potential of the galvanic cell under the ambient atmospheric condition such that the net output of the galvanic cell under the ambient condition is substantially zero, and means for detecting an increase in output of the galvanic cell greater than a predetermined value.

In the preferred embodiment the electrolytic element comprises a sheet of porous cellulose acetate treated with a deliquescent salt, such as $ZnCl_2$.

The invention will be described by way of example with reference the drawings in which.

Figure 1:
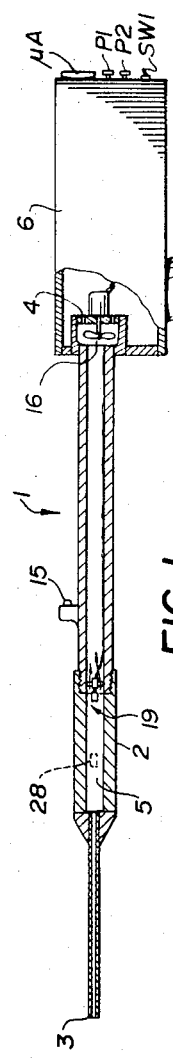
FIG. 1 is a longitudinal sectional view of the leak detector.

Referring to FIG. 1, the moisture leak detector 1 comprises an elongated tubular member 2 having an inlet 3 for receiving an air sample, an outlet 4 and an interconnecting passageway 5. The sensor assembly 19, shown in detail in FIGS. 2 and 3, supports the galvanic cell 10 and is disposed within the passageway 5. The galvanic cell 10 comprises a pair of electrodes 11 and 13 and deliquescent electrolytic element 12. One electrode 11 and the electrolytic element 12 are permeable to the air being sampled. A fan 16 provides means of drawing the air to be sampled through the passageway 5.

A heater 28, if required, for ambient conditions of high humidity, is disposed within the passageway 5 ahead of the sensor 19. The sensor 19, heater 28, and the detecting signal light 15 are coupled with components, to be described, within the housing 6. The detector is designed to be hand held, having a handle 7.

Figure 2:
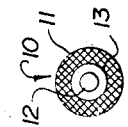
FIG. 2 is an exploded sectional view of the sensor assembly.
Figure 3:
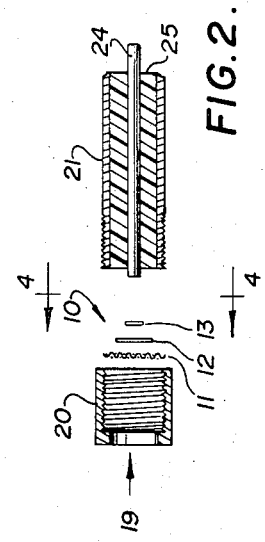
FIG. 3 is a sectional view of the sensor assembly showing the elements of FIG. 2 assembled.
Figure 4:
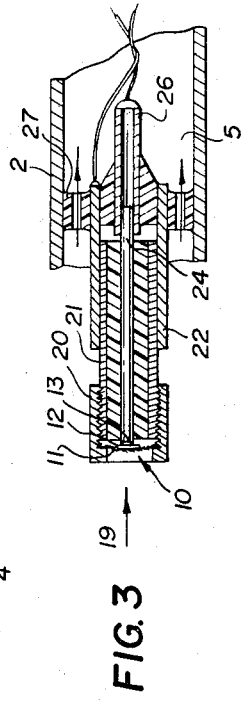
FIG. 4 is a view of the galvanic cell taken at 4—4 of FIG. 2.

Referring to FIGS. 2 and 3, the sensor assembly 19, comprises a galvanic cell 10 consisting of an anode 11, an electrolytic element 12 and a cathode 13; sensor body 21; and a retaining cap 20. The sensor body 21 is removably received by the socket member 22 which is attached to but electrically insulated from the tubular member 2 by supporting means 27 within the passageway 5. Electrical connection to the anode 11 is through the cap 20. With the cap properly tightened over the body 21 the rod 24 will make contact with the cathode 13 and also secure the cell in place. The rod 24 is insulated from the body 21. Upon inserting the sensor member 21 into the socket 22, the rod 24 contacts the tube 26. The outer member of socket 22 and the tube 26 are connected to the electrical circuitry within the housing 6.

The preferred embodiment of the galvanic cell comprises a stainless steel wire cloth anode and a cathode of gold foil. The electrolytic element found to be most suitable was a disc of porous cellulose acetate filter paper treated with saturated $ZnCl_2$ solution. In preparing the electrolytic disc the filter paper was soaked in the $ZnCl_2$ solution, and dried. To make the galvanic cell sensitive at higher humidities a more dilute solution of $ZnCl_2$ may be used.

Dimensions of the galvanic cell found to be sutiable are as follows: stainless steel wire cloth anode 80 mesh, 5/16 in. diam; gold cathode — 0.002 in. thick, ⅛ in. diam; porous cellulose acetate filter paper disc saturated with $ZnCl_2$ — 3/16 in. diam.

It will be understood that other materials may be used for the galvanic cell. Other suitable metal combinations for the electrodes are brass or Constantan with platinum. A suitable deliquescent salt other than $ZnCl_2$ is LiCl. $NaNO_3$, a non-deliquescent salt, is a suitable diluent for $ZnCl_2$.

Figure 5:
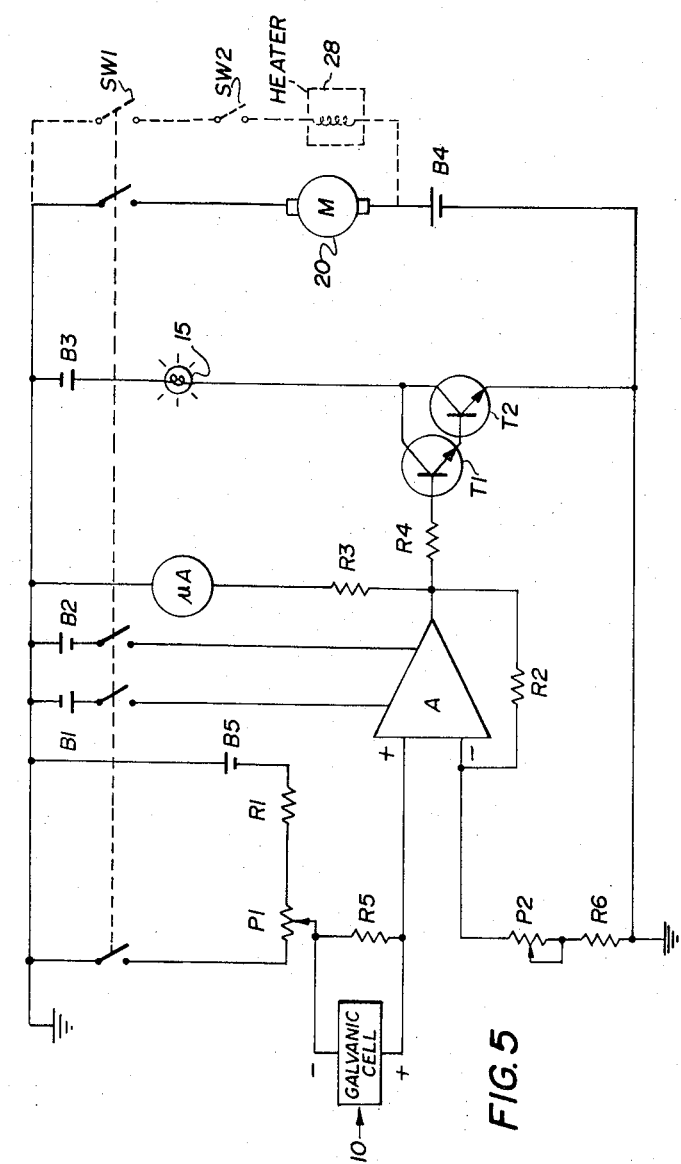
FIG. 5 is a schematic diagram of the electrical circuit.

Referring to FIG. 5 a megohm-range resistor R5 is connected across the galvanic cell 10. The voltage across the resistor R5 is offset by the battery B5, the offset voltage being controlled by the potentiometer P1. The zero-offset condition is determined by the center-zero microammeter $\mu A$ connected to the output of amplifier A. A signal light 15 is powered by battery B3 and triggered by transistors T1 and T2 whose input is connected to the otuput of the amplifier A. The circuit is designed such that the signal light is illuminated when a predetermined increase in output is produced. Sensitivity is adjusted by means of potentiometer P2.

To operate the detector the switch SW1 is turned on and the galvanic cell is allowed to attain equilibrium conditions. After this period the zero-offset potentiometer P1 is adjusted so that $\mu A$ reads zero under ambient conditions in the search area. The potentiometer P2 is adjusted to provide the desired sensitivity. Under conditions of variable ambient humidity or when the galvanic cell is excessively sensitive to humidity changes it may be necessary to reduce the gain of amplifier A by the adjustment of P2. To ensure that the sensitivity is sufficient the inlet 3 may be placed in proximity with a source of higher humidity. A finger or wet tissue paper near the inlet 3 should be sufficient to trigger the signal light 15.

When the relative humidity is high, for example greater than 65 percent, in order to prevent condensation within the passageway 5 or saturation of the electrolytic element it may be necessary to pre-heat the air entering the inlet before it reaches the galvanic cell to reduce its relative humidity. The necessary heat may be provided with a battery powered heater 28 if the flow rate of air through the passageway 5 is kept low. For a flow rate less than 15 ml/min the power required is less than 1 Watt.

In order to facilitate handling, the three parts of the galvanic cell may be preassembled by means of an annular disc of pressure-sensitive tape having a diameter greater than that of the electrolytic element and an aperture of sufficient size to allow the rod 24 to contact the electrode 13 when placed in the sensor assembly 19.

It will be understood that the physical arrangement of the detector and the electronic circuitry may be altered without departing from the scope of the present invention.

I claim:

What is claimed is:

1. A mositure leak detector comprising;
   a. an elongated tubular member having an inlet for receiving an air sample, an outlet and an interconnecting passageway;
   b. a galvanic cell sensitive to humidity disposed within said passageway, said cell having a pair of electrodes separated by a deliquescent electrolytic element, one of said electrodes and said electrolytic element being permeable to said air;
   c. means drawing said air through said inlet and said passageway to contact said electrolytic element; and
   d. variable voltage supply means for applying an external voltage to offset the potential of said galvanic cell under the ambient atmospheric condition such that the net output of said galvanic cell under the ambient condition is substantially zero, and means for detecting an increase in output of said galvanic cell greater than a predetermined value.

2. A moisture leak detector comprising;
   a. an elongated tubular member having an inlet for receiving an air sample, an outlet and an interconnecting passageway;
   b. a galvanic cell sensitive to humidity disposed within said passageway, said cell having a pair of electrodes separated by an electrolytic element comprising a sheet of porous cellulose acetate treated with a deliquescent salt, one of said electrodes and said electrolytic element being permeable to said air;
   c. means drawing said air through said inlet and said passageway to contact said electrolytic element; and
   d. means for detecting a change in electrical output of said galvanic cell to indicate the presence of a leak.

3. The apparatus of claim 2 wherein said deliquescent salt is $ZnCl_2$.

4. The apparatus of claim 2 wherein said permeable electrode comprises a metallic wire cloth.

5. The apparatus of claim 4 wherein said electrodes comprise an anode of stainless steel wire cloth and a cathode of gold.

* * * * *